(12) United States Patent
Tajima et al.

(10) Patent No.: US 8,545,980 B2
(45) Date of Patent: Oct. 1, 2013

(54) POLYPROPYLENE RESIN, FIBER, AND NONWOVEN FABRIC

(75) Inventors: Takeharu Tajima, Ichihara (JP); Toshitaka Kanai, Ichihara (JP); Tomoaki Takebe, Ichihara (JP); Yutaka Minami, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 748 days.

(21) Appl. No.: 11/719,144

(22) PCT Filed: Oct. 31, 2005

(86) PCT No.: PCT/JP2005/019986
§ 371 (c)(1),
(2), (4) Date: May 11, 2007

(87) PCT Pub. No.: WO2006/051708
PCT Pub. Date: May 18, 2006

(65) Prior Publication Data
US 2009/0098786 A1  Apr. 16, 2009

(30) Foreign Application Priority Data

Nov. 11, 2004  (JP) ................. 2004-327910

(51) Int. Cl.
| | | |
|---|---|---|
| *D02G 3/00* | (2006.01) | |
| *C08F 8/00* | (2006.01) | |
| *C08F 295/00* | (2006.01) | |
| *C08L 23/00* | (2006.01) | |
| *C08K 5/00* | (2006.01) | |

(52) U.S. Cl.
USPC ........... 428/364; 428/370; 428/375; 525/191; 525/240; 525/243; 525/245; 525/247; 525/263; 525/301; 525/323; 525/366; 525/386; 525/387; 526/160; 526/348; 526/348.1; 526/351; 526/943; 524/25; 524/26; 524/115; 524/210; 524/366; 524/494; 524/504; 524/505; 524/515

(58) Field of Classification Search
USPC ............... 428/364, 370, 375, 36.9, 523, 500; 252/8.9; 524/25, 26, 115, 366, 494, 504, 524/505, 210, 515; 525/240, 191, 243, 245, 525/247, 323, 386, 387; 526/351, 160, 348, 526/348.1, 943
See application file for complete search history.

(56) References Cited

U.S. PATENT DOCUMENTS

2003/0124286 A1* 7/2003 Kijima ..................... 428/36.9

FOREIGN PATENT DOCUMENTS

| JP | 06313207 A | * 11/1994 |
|---|---|---|
| JP | 8 81593 | 3/1996 |
| JP | 8 510801 | 11/1996 |
| JP | 10 183421 | 7/1998 |
| JP | 10183421 A | * 7/1998 |
| JP | 11 189914 | 7/1999 |
| JP | 2000 136212 | 5/2000 |
| JP | 2000 281723 | 10/2000 |
| JP | 2001 172325 | 6/2001 |
| JP | 2003 27331 | 1/2003 |
| JP | 2003-192851 | 7/2003 |
| WO | 01 92409 | 12/2001 |

OTHER PUBLICATIONS

Office Action issued Aug. 23, 2011 in Japanese Patent Application No. 2006-544842 (with partial English translation).

* cited by examiner

*Primary Examiner* — Elizabeth Cole
*Assistant Examiner* — Altrev Sykes
(74) *Attorney, Agent, or Firm* — Oblon, Spivak, McClalland, Maier & Neustadt, L.L.P.

(57) ABSTRACT

A polypropylene resin having: (1) a melt flow rate (MFR) of 6 to 100 g/10 minutes, (2) a molecular weight distribution (Mw/Mn), measured by gel permeation chromatography, of 3 to 6, and (3) a 116° C. non-eluted component content (100-W116(%)) of 50% or more and a content of components eluted at 90° C. or less (W90) of 10 to 30%, measured by temperature-rising fractional chromatography (TREF).

11 Claims, No Drawings

POLYPROPYLENE RESIN, FIBER, AND NONWOVEN FABRIC

TECHNICAL FIELD

The invention relates to a polypropylene resin, more specifically to a polypropylene resin with an excellent high-speed fiber spinning property from which a fiber can be produced with little breakage, and a fiber and nonwoven fabric produced from the resin.

BACKGROUND ART

Polypropylene resins have been widely used for fibrous applications because of their low cost and relatively good mechanical and spinning properties. Fibrous products of polypropylene resins, such as nonwoven fabrics require improvement in texture, lightness in weight and filtering property. A finer fiber is thus required.

In order to form finer fiber, spinning and winding must be carried out at higher speed than before in the spinning process. However high-speed spinning results in fiber breakage and thus lowers productivity.

Various materials have been designed to enhance the spinning property of polypropylene resins. For example, it is known that use of a polypropylene with a small molecular weight (large MFR) enhances the spinning property by lowering the melt viscosity of the resin. However the strength of the resulting fiber becomes low.

If spinning is carried out at high temperatures by raising the nozzle temperature, the melt viscosity can be lowered without need to reduce molecular weight. However the life of the nozzle is shortened due to gum formation, clogging and the like, and smoking increases.

As a means for improving spinning property without lowering melt viscosity (molecular weight) and changing the spinning temperature, it is known to decompose polypropylene with a high molecular weight using an organic peroxide, heat deterioration or the like and to use the resulting polypropylene with an adjusted molecular weight and narrow molecular weight distribution (for example, refer to JP-A-H8 (1996)-81593). However, this method has problems in that the peroxide causes color change and smoking occurs during spinning.

Regarding a solution to these problems it is reported that polypropylene having a narrow molecular weight distribution (e.g., Mw/Mn<3), for example, produced with a metallocene catalyst has an excellent high-speed spinning property (for example, refer to JP-T-H8 (1996)-510801, JP-A-H-101998)-183421 and JP-A-2000-136212).

It is also reported that spinning and other properties can be improved by removal of materials that cause smoking by cleansing with a solvent (for example, refer to JP-A-H11 (1999)-189914.)

Resins allowing higher speed spinning are still desired for enabling more finer fibers and enhanced productivity.

In view of the foregoing problems, an object of the invention is to provide a resin allowing high-speed spinning without changing the molecular weight of a resin, which affects the mechanical properties, or the spinning temperature and discharge rate, which affect productivity.

DISCLOSURE OF INVENTION

Through an intensive study, the inventors found that a polypropylene resin with novel properties over prior resin designs, i.e., a specific crystal distribution, can attain the foregoing object without requiring the molecular weight to be adjusted to a narrow distribution.

The invention provides the following polypropylene resin, production method thereof and fiber and nonwoven fabric made from the resin.

1. A polypropylene resin having:
   (1) a melt flow rate (MFR) of 6 to 100 g/10 minutes,
   (2) a molecular weight distribution (Mw/Mn), measured by gel permeation chromatography, of 3 to 6, and
   (3) a 116° C. non-eluted component content (100-W116(%)) of 50% or more and a content of components eluted at 90° C. or less (W90) of 10 to 30%, measured by temperature-rising fractional chromatography (TREF).

2. The polypropylene resin of 1 further having:
   (4) a meso pentad fraction (mmmm) of 85 to 94 mol %, and
   (5) a boiling n-heptane soluble component of 3 to 15 wt %.

3. The polypropylene resin of 1 further having:
   (6) a meso pentad fraction (mmmm) of 85 to 94 mol %, and
   (7) a 0° C. eluted component content, measured by temperature-rising fractional chromatography (TREF), of 3 to 6%.

4. The polypropylene resin of any one of 1 to 3, wherein a fiber spinning property (A) defined by the following expression [1] is more than 4500:

$$\text{Fiber spinning property}(A) = \text{spinning speed (m/min)} / [\text{mono-hole discharge amount (g/min)} \times \sqrt{\text{nozzle diameter (mm)}}] \quad [1].$$

5. The polypropylene resin of any one of 1 to 4, which is obtained by melting and kneading a high crystalline polypropylene and low crystalline polypropylene.

6. The polypropylene resin of 5, wherein the low crystalline polypropylene satisfies the following (a) to (d):
   (a) meso pentad fraction [mmmm] of 20 to 60%,
   (b) racemic pentad fraction [rrrr] and [1−mmmm] that satisfy the following expression $$[rrrr]/[1-mmmm] \leq 0.1,$$

(c) racemic meso racemic pentad fraction [rmrm] of 2.5 mol % or more, and
   (d) meso triad fraction [mm] racemic triad fraction [rr] and triad fraction [mr] that satisfy the following expression, $$mm \times rr/(mr)^2 \leq 2.0.$$

7. A fiber or nonwoven fabric comprising the polypropylene resin of any one of 1 to 6.
8. A drawn fiber obtainable by drawing the fiber of 7.

The polypropylene resin of the invention can be spun at high speeds without fiber breakage to produce fine fiber at a high productivity.

BEST MODE FOR CARRYING OUT THE INVENTION

The polypropylene resin of the invention will be described in detail below.

The polypropylene resin of the invention is characterized by satisfying the following (1) to (3):
(1) a melt flow rate (MFR) of 6 to 100 g/10 minutes,
(2) a molecular weight distribution (Mw/Mn) measured by gel permeation chromatography, of 3 to 6, and
(3) a 116° C. non-eluted component content (100-W116(%)) of 50% or more and a content of components eluted at 90° C. or less (W90) of 10 to 30%, measured by temperature-rising fractional chromatography (TREF).

The polypropylene resin of the invention has a melt flow rate (MFR) of 6 to 100 g/10 min. If MFR is less than 6 g/10 min, the resin cannot be spun owing to poor flowability. If MFR exceeds 100 g/10 min, the strength of the resulting fiber and nonwoven fabric decreases MFR is preferably 8 to 70 g/10 min. more preferably 10 to 40 g/10 min.

MFR is a value measured at 230° C. under 21.18 N load according to JIS K 7210.

The molecular weight distribution (Mw/Mn), ratio of weight average molecular weight (Mw) to number average molecular weight (Mn), measured by gel permeation chromatography (GPC), is 3 to 6. If the molecular weight distribution exceeds 6, stress is too high during spinning, leading to fiber breakage. If the molecular weight distribution is less than 3, fiber-swinging occurs, leading to fiber breakage since the fiber is unstable. The molecular weight distribution is preferably 3.5 to 6, more preferably 4 to 5.5.

The molecular weight distribution is determined by gel permeation chromatography (GPC). The details are described in Examples.

The content of components that are not eluted at 116° C. or less 100-W116) is 50% or more, and the content of components that are eluted at 90° C. or less (W90) is 10 to 30% in temperature-rising fractional chromatography (temperature-rising elution fraction, TREF).

In an elution curve obtained by temperature-rising fractional chromatography, W90, W116 and W0 show the contents (%) of components that are not absorbed to matrix and eluted at column temperatures of 90° C., 116° C. and 0° C., respectively. W0 indicates the content of non-crystallized components. W90 indicates the content of components with a low crystallization property that suppress the crystallization of polypropylene. (100-W116)% indicates the crystallization degree of polypropylene.

If (100-W116) is less than 50%, the molten resin does not readily solidify. The resin may easily adhere to a molding machine. (100-W116) is preferably 55 to 70%.

If W90 is less than 10%, crystallization rapidly occurs, resulting in fiber breakage in high-speed spinning. If W90 exceeds 30%, the resin cannot be spun since the molten resin does not solidify. W90 is preferably 12 to 20%.

The measurement of W90, W16 and W0 is described in detail in Examples.

The polypropylene resin of the invention preferably has a meso pentad fraction (mmmm) of 85 to 94 mol %.

mmmm is a meso fraction in a pentad unit of a polypropylene molecular chain determined from a methyl-group signal in a $^{13}$C-NMR spectrum. An increase in mmmm means an increase in stereoregularity.

If the meso pentad fraction is less than 85 mol %, the crystallization property may be too low for the molten resin to solidify. The resin may not be spinnable due to fusion among fibers and adhesion to a roller. The strength of the resulting fiber may also be reduced. If the meso pentad fraction exceeds 94 mol %, crystallization may rapidly occur when solidifying the molten resin causing fiber breakage in high-speed spinning mmmm is preferably 89 to 93 mol %.

The meso pentad fraction (mmmm) is measured according to the method described in Macromolecules, 6, 925 (1973), A. Zambelli et al. The measurement conditions are described in detail in Examples.

The polypropylene resin of the invention preferably has a boiling n-heptane soluble content of 3 to 15 wt %. This value indicates the amount of components with a low crystallization property particularly a small molecular weight. If the boiling n-heptane soluble content is 3 wt % or less crystallization may rapidly occur when solidifying the molten resin, causing fiber breakage in high-speed spinning. If the boiling n-heptane soluble content exceeds 15 wt %, the molten resin may not readily solidify and may not be spinnable due to stickiness. The boiling n-heptane soluble content is preferably 4 to 12 wt %.

The method of measuring the boiling n-heptane soluble content is described in Examples.

Preferred is a polypropylene resin whose content of components eluted at 0° C. (W0) In temperature-rising fractional chromatography (TREF) is 3 to 6%, instead of the boiling n-heptane soluble content. If the boiling n-heptane soluble content is 3% or less, crystallization may rapidly occur when solidifying the molten resin, causing fiber breakage in high-speed spinning. If the boiling n-heptane soluble content exceeds 6% the molten resin may not readily solidify and may not be spinnable due to stickiness. The boiling n-heptane soluble content (W0) is more preferably 3.2 to 5.0%.

The polypropylene resin of the invention can be produced by appropriately selecting the polymerization catalyst and method. The melt flow rate, molecular weight distribution, meso pentad fractions W0, W90, W116 and the boiling n-heptane soluble content can be adjusted by selection of the catalyst used in polymerization, the polymerization conditions (e.g. hydrogen amount), the content ratios of materials subjected to melting and kneading, and so on.

The polypropylene resin of the invention can also be produced by melting and kneading different polypropylene resins.

For example, production of the resin by melting and kneading different polypropylene resins can specifically be carried out by melting and kneading a high crystalline polypropylene resin (e.g., meso pentad fraction (mmmm)≥95 mol %) and a low crystalline polypropylene resin ((mmm)≤60 mol %). The molecular weight distribution can be adjusted by combining and kneading resins with different MFRs.

The melting and kneading method is not particularly limited. For example, the method can consist of weighing out the raw materials, dispersing them using a blender or the like, and placing the result in an extruder. When melting and kneading are carried out in an extruder, each raw material resin is preferably sufficiently homogeneously dispersed and care should be taken not to degrade the resins.

Any low crystalline polypropylene resin with [mmmm] of 60 mol % or less can be used. A particularly preferable low crystalline polypropylene resin satisfies the following (a) to (d).

(a) meso pentad fraction [mmmm] of 20 to 60%,
(b) racemic pentad fraction [rrrr] and [1−mmmm] that satisfy the following expression, $$[rrrr]/[1-mmmm] \leq 0.1$$

(c) racemic meso racemic pentad fraction [rmrm] of 2.5 mol % or more, and
(d) meso triad fraction [mm], racemic triad fraction [rr] and triad fraction [mr] that satisfy the following expression, $$mm \times rr/(mr)^2 \leq 2.0$$

The low crystalline polypropylene resin is preferably a propylene homopolymer.

The low crystalline polypropylene resin preferably has a meso pentad fraction [mmmm] of 20 to 60 mol %. An increased meso pentad fraction [mmmm] means an increased stereoregularity.

If the meso pentad fraction [mmmm] is less than 20 mol %, stickiness may occur. If it exceeds 60 mol %, the crystallization degree may be so high that the high-speed spinning property deteriorates.

The [rrrr]/[1−mmmm] of the low crystalline polypropylene resin is preferably 0.1 or less, more preferably 0.05 or less, still more preferably 0.04 or less.

The [rrrr]/[1−mmmm] can be determined from the above meso pentad fraction, and is an index of homogeneousness of regular distribution of a low crystalline polypropylene resin.

If this value is large, regular distribution increases. A resin with a large value is a mixture of high stereoregular polypropylene and atactic polypropylene like conventional polypropylene produced by using known catalyst systems. This may cause stickiness.

The low crystalline polypropylene resin preferably has a racemic meso racemic pentad fraction [rmrm] of 2.5 mol % or more, more preferably 2.6 mol % or more, still more preferably 2.7 mol % or more.

If the racemic meso racemic pentad fraction [rmrm] is mol % or more, the randomness of the polymer increases to provide an enhanced high-speed spinning property and drawability. If it is less than 2.5 mol %, the high-speed spinning property may deteriorate.

mm×rr/(mr)$^2$ is preferably 2.0 or less, more preferably 1.8 or less still more preferably 1.5 or less.

mm×rr/(mr)$^2$ indicates the randomness of the polymer. As it approaches 0.25, the randomness increases to provide an increasingly excellent high-speed spinning property and drawability.

The above meso pentad fraction [mmmm], pentad fraction [rrrr] and racemic meso racemic pentad fraction [rmrm] are respectively a meso fraction, racemic fraction and racemic meso racemic pentad fraction in a pentad unit of a polypropylene molecular chain determined by a methyl-group signal in a $^{13}$C—NMR spectrum according to the method described in "Macromolecules, 6, 925(1973), A. Zambelli et al".

The measurement is described in detail in Examples.

The above low crystalline polypropylene resin can be produced by appropriately selecting the polymerization catalyst and method.

So far as the object of the invention can be attained, the polypropylene resin can be one obtained by co-polymerizing a comonomer in addition to propylene.

The polypropylene resin of the invention may contain known antioxidants, metal salts of fatty acids such as calcium stearate, hydrotalcites, weatherproofing agents, ultraviolet absorbers, pigments, dyes and so on.

The polypropylene resin of the invention has an excellent high-speed spinning property. Specifically the spinning property (A) represented by the following expression [1] is preferably larger than 4500.

Fiber spinning property(A)=spinning speed (m/min)/
[mono-hole discharge amount (g/min)×√nozzle
diameter (mm)]    [1]

The high-speed spinning property of the resin improves in proportion as A in the expression [1] is larger. No polypropylene resin with a spinning property (A) of greater than 4500 has existed heretofore. This resin is significantly superior in high-speed spinning property. The spinning property (A) is particularly preferably greater than 5000.

Here the "spinning speed" is the rotary speed (number) allowing continuous spinning for 4 minutes when raising the rotary speed of a high-speed winder in a melting-kneading machine. The "mono-hole discharge amount" is the discharge amount per hole formed in a round-shaped die in a melting-kneading machine. The "nozzle diameter" means the hole diameter.

In general, the frequency of fiber breakage increases with smaller discharge amounts or smaller nozzle diameter. Thus the spinning property (A) may slightly change depending on the spinning conditions. The measuring conditions are described in detail in Examples.

The fiber and nonwoven fabric of the invention can be obtained by molding the above polypropylene resin of the invention. Examples of the fiber include, for instance, a fiber formed by melting a resin and extruding the molten resin through fine holes in a thread-like shape and a composite fiber having the resin of the invention exposed on all or a part of the fiber surface, e.g., a composite fiber having a core-sheath structure or side-by side structure. A fiber with an even finer diameter can be obtained by drawing these fibers.

EXAMPLES

The invention will be described in detail with reference to Examples. In Examples, the polypropylene resin of the invention was produced by melting and kneading a plurality of polypropylene resins.

The properties of polypropylene resins produced or used in Examples and Comparative Examples were evaluated by the following methods.

(1) Melt Flow Rate (MFR)

Measured at 230° C. under 21.18N load according to JIS K 7210.

(2) Molecular Weight Distribution (Mw/Mn)
  GPC Measuring Apparatus
  Column: TOSO GMHHR-H(s)HT
  Detector: R1 detector for liquid chromatography, WATERS150C
  Measurement Conditions
  Solvent: 1,2,4-trichlorobenzene
  Measurement temperature 145° C.
  Flow rate: 1.0 ml/min
  Sample concentration: 2.2 mg/ml
  Injection rate: 160 μl
  Detection line: Universal Calibration
  Analysis program: HT-GPC (Ver. 1.0)

(3) Temperature-rising fractional chromatography (TREF)
  Solution: To 60 mg of a sample was added 10 ml of o-dichloro-benzene and the result was heated under stirring in an aluminum block heater at 150° C. with a magnetic stirrer for 60 minutes.
  Analysis: A sample solution was crystallized by cooling and then heated to measure the amount of an eluted sample under the following conditions. The eluted-sample amount was plotted against temperature.
  Column: Made of stainless steel, filled with Chromosorb P (30/60) size 4.2 mmΦ×50 mm
  Amount of charged sample: 3 mg
  Solvent (moving phase): o-dichlorobenzene (Wako special grade)
  Crystallization: Temperature-dropping range, 130° C. to 0°,
    Temperature-dropping rate, 5° C./hr
    Holding time at 0° C., 30 minutes
  Elution: Temperature-rising range, 0° C. to 35° C.,
    Temperature rising rate, 40° C./hr,
    Moving phase flow rate, 1.0 ml/min,
    Time for measuring 0° C. eluted parts 20 minutes
  Detector: IR (provided with a flow cell whose temperature could be raised), wavelength 3.41 μm (4) Boiling N-Heptane Soluble Content The polypropylene resin was soxhlet-extracted with boiling n-heptane for 6 hours. The amount of extracted components was determined as the difference between the polypropylene resin weight before the extraction and the remaining polypropylene resin weight after the extraction. The boiling n-heptane soluble content is the rate obtained by dividing the extracted-component amount by the polypropylene resin weight before the extraction.

(5) Fiber Spinning Property

The spinning property was evaluated as follows:

The molten polypropylene resin was extruded from a nozzle in a melting spinning apparatus with a circular die (hole diameter Φ: 0.6 mm, hole number: 10) under the conditions of a spinning temperature of 230° C. and a mono-hole discharge amount of 2 g/min. The extruded resin was wound by a high-speed winder located 280 cm below the spinning apparatus while changing the rotary speed.

The fiber breakage speed was taken as the speed at which fiber breakage occurs when raising the rotary number of the high-speed winder. The spinning speed was taken as the rotary speed allowing continuous spinning for 4 minutes.

Under the above conditions, the spinning property A was calculated from the expression [1].

Fiber spinning property($A$)=spinning speed (m/min)/
[mono-hole discharge amount (g/min)×$\sqrt{}$nozzle diameter (mm)]    [1]

(6) Meso Pentad Fraction [mmmm] Racemic Pentad Fraction [rrrr], Racemic Meso Racemic Pentad Fraction [rmrm]

$^{13}$C-NMR spectrum measurement was carried out with the following instruments and conditions according to the peak assignment proposed by A. Zambelli et al. in Macromolecules, 8, 687 (1975).

Instrument: JNM-EX400 $^{13}$C-NMR analyzer manufactured by JEOL Ltd.
Method: Proton complete decoupling method
Concentration: 220 mg/ml
Solvent: 90:10 (volume ratio) mixed solvent of 1,2,4-trichlorobenzene and benzene-$d_6$
Temperature: 130° C.
Pulse width: 45°
Pulse repetition time: 4 seconds
Integration: 10000 times <Calculating Formula>

$M=m/S \times 100$ $R=\gamma/S \times 100$ $S=P\beta\beta+P\alpha\beta+P\alpha\gamma$ S: Signal strength of side chain methyl carbon atoms in all propylene units
Pββ: 19.8 to 22.5 ppm
Pαβ: 18.0 to 17.5 ppm
Pαγ: 17.5 to 17.1 ppm
γ: Racemic pentad chain: 20.7 to 20.3 ppm
m: Meso pentad chain: 21.7 to 22.5 ppm Example 1

A resin material was prepared by mixing 74 mol % of high crystalline propylene with an MFR of 18.0 g/10 min and mmmm of 97 mol % (manufactured by Idemitsu Kosan Co., Ltd.: IDEMITSU PP Y-2000GV) as a first component, 14 wt % of high crystalline propylene with an MFR of 500 g/10 min and mmmm of 98 mol % (manufactured by Idemitsu Kosan Co., Ltd: IDEMITSU PP H-5000) as a second component and 12 wt % of low crystalline propylene with an MFR of 1.9 g/10 min and mmmm of 45 mol % (LP200G) as a third component.

The resin material was melted and kneaded at 160° C. in a biaxial extruder (manufactured by TOSHIBA MACHINE CO. Ltd.: TEM-35B) to produce polypropylene resin pellets.

The polypropylene resin thus obtained had an MFR of 18.1 g/10 min, which corresponds to the polypropylene resin of claim 3. The low crystalline propylene (LP200G) was produced by the following method.

Production of Low Crystalline Polypropylene Resin (1) Catalyst Preparation

Synthesis of (1,2'-dimethylsilylene)(2,1'-dimethylsilylene)-bis(3-trime thylsilylmethylindenyl) zirconium dichloride 3.0 g (6.97 mmol) of a lithium salt of (1,2'-dimethylsilylene)(2,1'-dimethylsilylene)-bis(indene) was dissolved in 50 mL of tetrahydrofuran (THF) in a Schlenk's flask. The solution was cooled to −78° C.

2.1 mL (14.2 mmol) of iodomethyltrimethylsilane was slowly dripped into the solution and stirred at room temperature for 12 hours. After the solvent was evaporated off, 50 mL of ether was added, followed by washing with a saturated ammonium chloride solution.

After separation, an organic phase was dried and the solvent was removed to obtain 3.04 g (5.88 mmol) of (1,2'-dimethylsilylene)(2,1'-dimethylsilylene)-bis(3-trime thylsilylmethylindene) in an 84% yield.

The above 3.04 g (5.88 mmol) or (1,2'-dimethylsilylene)(2,1'-demethylsilylene)-bis(3-trime thylsilylmethylindene) and 50 mL of ether were placed in a Schlenk's flask in a nitrogen gas stream. 7.6 mL (11.7 mmol) of n-BuLi (hexane solution 1.54 mol/L) cooled to −78° C. was added to the flask, followed by stirring at room temperature for 12 hours.

The solvent was evaporated off and the solids obtained were washed with 40 mL of hexane to obtain 3.06 g (5.07 mmol) of a lithium salt as an ether adduct in a 73% yield.

The result of the measurement of the ether adduct by $^1$H-NMR (90 MHZ, THF-d8) was as follows: δ0.4 (s, 18H, trimethylsilyl), 0.48 (s, 12H, dimethylsilyl) 1.10 (t, 6H, methyl) 2.59 (s, 4H, methylene), 3.38 (q, 4H, methylene), 6.2 to 7.7 (m, 8H, Ar—H).

In a nitrogen gas stream, the lithium salt obtained was dissolved in 50 mL of toluene. The resultant solution was cooled to −78° C. and a toluene suspension (20 mL) of zirconium tetrachloride 1.2 g (5.1 mmol), which had been cooled to −78° C. in advance, was dripped into it. Thereafter the solution was stirred at room temperature for 6 hours. The solvent of the reaction solution was evaporated off.

The residue obtained was re-crystallized from dichloromethane to provide 0.9 g (1.33 mmol) of (1,2'-dimethylsilylene) (2,1'-dimethylsilylene)-bis(3-trime thylsilylmethylindenyl)zirconium dichloride in a 26% yield.

The result of the measurement of this compound by $^1$H-NMR (90 MHZ, CDCl$_3$) was as follows: δ0.0 (s, 18H, trimethylsilyl), 1.02, 1.12 (s, 12H, dimethylsilylene), 2.51 (dd, 4H, methylene), 7.1 to 7.6 (m, 8H, Ar—H).

(2) Propylene Polymerization

To a stainless reactor with a stirrer having an internal volume of 250 L were continuously supplied n-heptane at 37.4 L/h, triisobutyl aluminum (manufactured by Nippon Aluminum Alkyls, Ltd.) at 19 mmol/h, methyl aluminoxane (manufactured by Albemarle Corporation) at 13.6 mmol/h, and (1,2'-dimethylsilylene) (2,1"-dimethylsilylene)-bis(3-trimethylsilylmethylindenyl) zirconium dichloride obtained in the above (1) at 13.6 μmol/h.

Further, propylene and hydrogen were continuously supplied such that the hydrogen/propylene volume ratio was maintained at 0.03 in the gas phase and the total pressure in the reactor was maintained at 0.8 MPaG.

Polymerization was continuously carried out at 60° C. for a residence time of 90 minutes to produce low crystalline propylene.

To the polymerization solution obtained were added 500 ppm of a phenol-type antioxidant "Irganox 1010" (manufactured by Ciba Specialty Chemicals) and 1,000 ppm of a phosphorus-type antioxidant "Irgafos 108" (manufactured by Ciba Specialty Chemicals) based on the polymer contained therein. The resultant solution was subjected to melt flushing at a jacket temperature of 220° C. with two flush drums provided with a plate-fin-type polymer heater to remove solvent.

(3) Granule Production

The molten resin (resin temperature: 200° C.) after flushing was extruded using a gear pump and granulated by a cutter usable in water with a rotary-drum-type solid-liquid separator (manufactured by Tanabe Plastics Machinery Co. Ltd.: PASC-21-HS type).

The period from when resin pieces were cut to when the cut resin pieces reached the separator (period during which granules are retained in water) was set by adjusting the length of the tube connecting the cutter to the separator. In this Example 1, the retention time of granules in water was 4 seconds and the water temperature was 20° C. Low crystalline polypropylene resin granules were thus obtained.

Example 2

A resin material was prepared by mixing 6/wt % of high crystalline propylene with an MFR of 18.0 g/10 min and mmmm of 97 mol % (manufactured by Idemitsu Kosan Co, Ltd.: IDEMITSU PP Y-2000GV) as a first components 21 wt % of high crystalline propylene with an MER of 3.0 g/10 min and mmmm of 97 mol % (manufactured by Idemitsu Kosan Co., Ltd: IDEMITSU PP F-300SV) as a second component and 12 wt % of low crystalline propylene with a mass average molecular weight of 32000, mmmm of 44.6 mol %, rrrr/(1−mmmm) of 0.036, rmrm of 2.7 mol % and mm×rr/$(mm)^2$ of 1.4 as a third component.

The resin material was melted and kneaded at 200° C. in a biaxial extruder (manufactured by Toshiba Machine Co. Ltd.: TEM-35B) to produce polypropylene resin pellets. The resin had an MFR of 20.1 g/10 min, which corresponds to the polypropylene resin of claim 2. The low crystalline propylene was produced by the following method.

Production of Low Crystalline Polypropylene Resin (1) Catalyst Synthesis

Synthesis of 2-chlorodimethylsilylindene 50 mL of THF (tetrahydrofuran) and 2.5 g (41 mmol) of magnesium were placed in a 1 L three-neck flask in a nitrogen gas stream. 0.1 mL of 1,2-dibromoethane was added to the flask, followed by stirring for 30 minutes to activate the magnesium. After stirring, the solvent was removed and 50 mL of fresh THF was added. A solution containing 5.0 g (25.6 mmol) of 2-bromoindene in THF (200 mL) was then dripped into the resultant solution over 2 hours.

Following the completion of the addition, the resultant solution was stirred at room temperature for 2 hours, and cooled to −78° C. A solution containing 3.1 mL (2.6 mmol) of dichlorodimethylsilane in THF (100 mL) was dripped in over 1 hour, followed by stirring for 15 hours. After evaporating off the solvent, the residue was extracted with 200 mL of hexane Evaporation of the solvent gave 6.6 g (24.2 mmol) of 2-chlorodimethylsilylindene in a 94% yield.

Production of (1,2'-dimethylsilylene)(2,1'-dimethylsilylene)-bis(indene)

In a nitrogen gas stream, 400 mL of THF and 8 g of 2-chlorodimethylsilylindene were placed in a 1 L three-neck flask and cooled to −78° C. Into the solution was dripped 38.5 mL (38.5 mmol) of $LiN(SiMe_3)_2$ solution in THF (1.0 mol/L). After the resultant solution was stirred at room temperature for 15 hours, the solvent was evaporated and the residue was extracted with 300 mL of hexane.

Evaporation of the solvent gave 2.0 g (6.4 mmol) of (1,2'-dimethylsilylene)(2,1'-dimethylsilylene)-bis(indene) in a 33.4% yield.

Synthesis of (1,2'-dimethylsilylene)(2,1'-dimethylsilylene)-bis(3-trime thylsilylmethylindenyl)zirconium dichloride 2.5 g (7.2 mmol) of (1,2'-dimethylsilylene)(2,1'-dimethylsilylene)-bis(indene) obtained in (2) and 100 mL of ether were placed in a 200 mL Schlenk's flask in a nitrogen gas stream and cooled to −78° C. After adding 9.0 mL (14.8 mmol) of n-butyl lithium (n-BuLi) solution in hexane (1.6 M), the mixture was stirred at room temperature for 12 hours. Solids obtained by evaporating off the solvent were washed with 20 mL of hexane and dried under reduced pressure to provide a lithium salt as a white solid quantitatively.

A lithium salt of (1,2'-dimethylsilylene)(2,1'-dimethylsilylene)-bis(indene) (6.97 mmol) was dissolved in 50 mL of THF in a Schlenk's flask. 2.1 mL (14.2 mmol) of iodomethyltrimethylsilane was slowly dripped into the solution, followed by stirring at room temperature for 12 hours.

After the solvent was evaporated off, 50 mL of ether was added, followed by washing with a saturated ammonium chloride solution. After separation, the organic phase was dried and the solvent was removed to obtain 3.04 g (5.9 mmol) of (1,2'-dimethylsilylene)(2,11-dimethylsilylene)-bis (3-trime thylsilylmethylindene) in an 84% yield.

Next, the above 3.04 g (5.9 mmol) of (1,2'-dimethylsilylene)(2,1'-dimethylsilylene)-bis(3-trime thylsilylmethylindene) zirconium dichloride and 50 mL of ether were placed in a Schlenk's flask in a nitrogen gas stream. 7.4 mL (11.8-mol) of n-butyl lithium (n-BuLi) hexane solution (1.6 M) cooled to −78° C. was added thereto and stirred at room temperature for 12 hours. The solvent was evaporated off and the solids obtained were washed with 40 mL of hexane to obtain 3.06 g of a lithium salt as an ether adduct.

The result of measurement of this lithium salt by $^1$H-NMR (90 MHz, THF-d8) was as follows: δ0.04 (s, —$SiMe_3$, 18H), 0.48 (s, —$Me_2Si$—, 12H), 1.10 (t, —$CH_3$, 6H), 2.59 (s, —$CH_2$—, 4H) 3.38 (q, —$CH_2$—, 4H) 6.2-7.7 (ma Ar—H, 8H).

In a nitrogen gas stream, 3.06 g of the lithium salt obtained was suspended in 50 mL of toluene. The resultant solution was cooled to −78° C. and a toluene suspension (20 mL) of zirconium tetrachloride 1.2 g (5.1 mmol), which had been cooled to −78° C. in advance, was dripped into it. Thereafter the solution was stirred at room temperature for 6 hours. The solvent of the reaction solution was evaporated off. The residue obtained was re-crystallized from dichloromethane to provide 0.9 g (1.33 mmol) of (1,2'-dimethylsilylene) (2,1'-dimethylsilylene)-bis(3-trime thylsilylmethylindenyl) zirconium dichloride in a 26% yield.

The result of measurement of this compound by $^1$H-NMR (90 MHZ, CDCl$_3$) was as follows: δ0.0 (s, —SiMe$_3$—, 18H), 1.02, 1.12 (s, —Me$_2$Si—, 12H), 2.51 (dd, CH$_2$—, 4H), 7.1-7.6 (m, Ar—H, 8H).

(2) Propylene Polymerization

To a stainless reactor with a stirrer having an internal volume of 0.25 m$^3$ were continuously supplied n-heptane at 20 L/h, triisobutyl aluminum at 16 mmol/h, methyl aluminoxane at 15 mmol/h, and (1,2'-dimethylsilylene) (2,1'-dimethylsilylene)-bis(3-trimethylsilylmethylindenyl) zirconium dichloride obtained in Production Example 1 at 15 μmol/h. Propylene and hydrogen were continuously supplied such that the hydrogen concentration in the gas phase was 54 mol % at a polymerization temperature of 60° C. and the total pressure in the reactor was maintained at 0.75 MPa·G. Polymerization solution was continuously drawn off. To the polymerization solution obtained were added 500 ppm of an antioxidant "Irganox 1010" (manufactured by Ciba Specialty Chemicals). The solvent was removed at a jacket temperature of 200° C. The residue was freeze-dried and pulverized to obtain low crystalline polypropylene granules.

Example 3

A polypropylene resin was produced in the same manner as in Example 1 except that the amounts of the first, second and third components were changed to 52 wt %, 26 wt % and 22 wt %, respectively. The MFR of the resin was 17.5 g/10 min.

Example 4

A polypropylene resin was produced in the same manner as in Example 2 except that the amounts of the first, second and third components were changed to 39 wt % 39 wt % and 22 wt %, respectively. The MFR of the resin was 19.8 g/10 min.

Comparative Example 1

Propylene with an MFR of 20.0 g/10 min (manufactured by Idemitsu Kosan Co., Ltd.: IDEMITSU PP Y-205GP) was used.

Comparative Example 2

A peroxide (manufactured by Kayaku Akzo Corporation: Kayakuhexane AD) was added to polypropylene with an MFR of 3.0 g/10 min and mmmm of 91 mol % (manufactured by Idemitsu Kosan Co., Ltd.: IDEMITSU PP F-200SP). The resultant mixture was melted and kneaded at 200° C. in a biaxial extruder (manufactured by Toshiba Machine Co. Ltd.: TEM-35B) to provide polypropylene resin pellets with an MFR of 16.5 g/10 min.

Comparative Example 3

Only the polypropylene with an MFR of 18.0 g/10 min manufactured by Idemitsu Kosan Co., Ltd.: IDEMITSU PP Y-2000GV), which is the first component in Examples 1 and 2, was used.

Comparative Example 4

65 wt % of polypropylene produced in Comparative Example 2 as a first component, and 35 wt % of low crystalline polypropylene with an MFR of 18.2 g/10 min and mmmm of 45 mol % (LP2000G) as a second component were mixed. The mixture was molten and kneaded at 200° C. in a biaxial extruder (manufactured by Toshiba Machine Co., Ltd.: TEM-35B). The MFR of the polypropylene obtained was 17.0 g/10 min.

The second component was prepared according to the method described in JP-A-2001-214727, paragraphs [0024] to [0026].

Comparative Example 5

Propylene with an MFR of 22.0 g/10 min, which was produced using a metallocene catalyst, was used. This polypropylene was obtained according to the method described in Production Example of JP-A-2001-123322.

The evaluation of polypropylene resins produced in Examples 1 to 4 and Comparative Examples 1 to 5 are shown in Tables 1 and 2.

Example 5

The polypropylene resin of Example 2 was melted and extruded at a spinning temperature of 230° C. through a die with 10 holes and 0.6 min diameter and then wound at a winding rate of 4,000 m/second to produce a non-oriented fiber. This non-oriented fiber was drawn by a vertical contact type drawing machine with a heater at a feed rate of 12 m/minute at a drawing temperature of 120° C. to obtain an oriented fiber with a diameter of 20 μm. A 500 tex fiber bundle was made from this fiber and subjected to tensile test with a JISL1013:1999 constant-speed elongation instrument. The strength was found to be 4.5 cN/dtex.

TABLE 1

| Evaluation Item | Unit | Example 1 | Example 2 | Example 3 | Example 4 |
|---|---|---|---|---|---|
| Melt flow rate (MFR) | g/10 min | 18.1 | 20.1 | 17.5 | 19.8 |
| Molecular weight distribution (Mw/Mn) | — | 3.6 | 4.2 | 4.2 | 5.1 |
| Meso pentad (mmmm) | mol % | 91 | 91 | 86 | 86 |
| n-Heptane solube component | wt % | 2.1 | 7.7 | 3.6 | 13.6 |
| W0* | % | 3.54 | 2.16 | 5.77 | 3.42 |
| W90* | % | 13.8 | 16.1 | 22.8 | 27.6 |
| 100-W116* | % | 60.8 | 63.6 | 51.0 | 55.5 |
| Fiber breakage rate | m/min | 10000 | 9000 | 9500 | 9000 |
| Spinning rate | m/min | 9000 | 8000 | 9000 | 8000 |
| Spinning property (A) | — | 5800 | 5200 | 5800 | 5200 |

*Wx is a rate of components eluted at X° C. or less measured by temperature-rising fractional chromatography (TREF).

TABLE 2

| Evaluation Item | Unit | Comparative example 1 | Comparative example 2 | Comparative example 3 | Comparative example 4 | Comparative example 5 |
|---|---|---|---|---|---|---|
| Melt flow rate (MFR) | g/10 min | 20.0 | 16.5 | 18.0 | 17.0 | 22.0 |
| Molecular weight distribution (Mw/Mn) | — | 4.0 | 2.8 | 2.9 | 2.4 | 2.1 |
| Meso pentad (mmmm) | mol % | 93 | 91 | 97 | 75 | 90 |
| n-Heptane solube component | wt % | 2.1 | 2.7 | 0.9 | 18.8 | 8.2 |
| W0* | % | 1.25 | 2.05 | 0.91 | 7.75 | 0.11 |
| W90* | % | 7.0 | 8.9 | 3.1 | 42.5 | 3.7 |
| 100-W116* | % | 35.5 | 24.8 | 72.8 | 8.7 | 0.0 |
| Fiber breakage rate | m/min | 4500 | 5500 | 6000 | 7000 | 8000 |
| Spinning rate | m/min | 4000 | 5000 | 5000 | 6000 | 7000 |
| Spinning property (A) | — | 2600 | 3200 | 3200 | 3900 | 4500 |

*Wx is a rate of components eluted at X° C. or less measured by temperature-rising fractional chromatography (TREF).

INDUSTRIAL APPLICABILITY

The polypropylene resin of the invention can be suitably used for producing polypropylene products such as polypropylene fibers, nonwoven fabrics (e.g. spunbond nonwoven fabric) and multifilaments.

The invention claimed is:

1. A polypropylene resin produced by melting and kneading a first crystalline polypropylene and 12 to 22 wt % of a second crystalline polypropylene having a meso pentad fraction less than the first crystalline polypropylene,
   wherein the polypropylene resin has the following properties (1) to (5):
   (1) a melt flow rate (MFR) of 6 to 100 g/10 minutes,
   (2) a molecular weight distribution (Mw/Mn), measured by gel permeation chromatography, of 3 to 6, and
   (3) a 116° C. non-eluted component content (100-W116(%)) of 50% or more and a content of components eluted at 90° C. or less (W90) of 10 to 30%, measured by temperature-rising fractional chromatography (TREF),
   (4) a meso pentad fraction (mmmm) of 85 to 94 mol %, and
   (5) a boiling n-heptane soluble component of 3 to 15 wt %;
   wherein the second crystalline polypropylene satisfies the following (a) to (d):
   (a) meso pentad fraction [mmmm] of 20 to 60%,
   (b) racemic pentad fraction [rrrr] and [1−mmmm] that satisfy the following expression $[rrrr]/[1-mmmm] \leq 0.1$, (c) racemic meso racemic pentad fraction [rmrm] of 2.5 mol % or more, and
   (d) meso triad fraction [mm], racemic triad fraction [rr] and triad fraction [mr] that satisfy the following expression, $mm \times rr/(mr)^2 \leq 2.0$.

2. The polypropylene resin of claim 1 having a 0° C. eluted component content, measured by temperature-rising fractional chromatography (TREF), of 3 to 6%.

3. The polypropylene resin of claim 1, which has a fiber spinning property (A) defined by the following expression [1] is more than 4500:

Fiber spinning property(A)=spinning speed (m/min)/[mono-hole discharge amount (g/min)×√nozzle diameter (mm)]  [1].

4. A fiber or nonwoven fabric comprising the polypropylene resin of claim 1.

5. A drawn fiber produced by the process of drawing the fiber of claim 4.

6. A process for producing the polypropylene resin of claim 1 comprising melting and kneading a first crystalline polypropylene and a second crystalline polypropylene having a meso pentad fraction less than the first crystalline polypropylene,
   wherein the second crystalline polypropylene satisfies the following (a):
   (a) meso pentad fraction [mmmm] of 20 to 60%.

7. A process for producing a drawn fiber comprising drawing the fiber of claim 4.

8. The polypropylene resin of claim 1, wherein the molecular weight distribution (Mw/Mn) is 4 to 6.

9. A polypropylene resin produced by melting and kneading a first crystalline polypropylene and a second crystalline polypropylene having a meso pentad fraction less than the first crystalline polypropylene,
   wherein the polypropylene resin has the following properties (1) to (5):
   (1) a melt flow rate (MFR) of 6 to 100 g/10 minutes,
   (2) a molecular weight distribution (Mw/Mn), measured by gel permeation chromatography, of 3 to 6, and
   (3) a 116° C. non-eluted component content (100-W116(%)) of 50% or more and a content of components eluted at 90° C. or less (W90) of 10 to 30%, measured by temperature-rising fractional chromatography (TREF),
   (4) a meso pentad fraction (mmmm) of 85 to 94 mol %, and
   (5) a boiling n-heptane soluble component of 3 to 15 wt %;
   wherein the second crystalline polypropylene satisfies the following (a) to (d):
   (a) meso pentad fraction [mmmm] of 20 to 60%,
   (b) racemic pentad fraction [rrrr] and [1−mmmm] that satisfy the following expression $[rrrr]/[1-mmmm] \leq 0.1$, (c) racemic meso racemic pentad fraction [rmrm] of 2.5 mol % or more, and
   (d) meso triad fraction [mm], racemic triad fraction [a] and triad fraction [mr] that satisfy the following expression, $mm \times rr/(mr)^2 \leq 2.0$; and wherein the polypropylene resin has a fiber spinning property (A) defined by the following expression [1] of more than 4500:

Fiber spinning property(A)=spinning speed (m/min)/[mono-hole discharge amount (g/min)×√nozzle diameter (mm)]  [1].

10. The polypropylene resin of claim 1, wherein the first crystalline polypropylene has a meso pentad fraction (mmmm)≥95 mol %.

11. The polypropylene resin of claim 9, wherein the first crystalline polypropylene has a meso pentad fraction (mmmm)≥95 mol %.

\* \* \* \* \*